(12) United States Patent
Negel

(10) Patent No.: US 8,262,240 B2
(45) Date of Patent: Sep. 11, 2012

(54) REAR VIEW MIRROR

(75) Inventor: Raimund Negel, Unterensingen (DE)

(73) Assignee: SMR Patents S.a.r.l., Luxembourg (LU)

( * ) Notice: Subject to any disclaimer, the term of this patent is extended or adjusted under 35 U.S.C. 154(b) by 438 days.

(21) Appl. No.: 12/562,342

(22) Filed: Sep. 18, 2009

(65) Prior Publication Data

US 2010/0067131 A1 Mar. 18, 2010

(30) Foreign Application Priority Data

Sep. 18, 2008 (EP) .................... 08164588

(51) Int. Cl.
*G02B 5/08* (2006.01)
*G02B 7/18* (2006.01)
*A47G 1/24* (2006.01)
*B60R 1/02* (2006.01)

(52) U.S. Cl. .......................... 359/841; 359/877; 248/479

(58) Field of Classification Search .................. 359/841, 359/872, 877; 248/479, 480
See application file for complete search history.

(56) References Cited

U.S. PATENT DOCUMENTS

| | | | |
|---|---|---|---|
| 2,552,074 A | 4/1948 | Thompson | |
| 2,839,965 A * | 6/1958 | Budreck | 248/480 |
| 2,969,715 A | 9/1958 | Mosby | |
| 4,558,930 A | 12/1985 | Deedreek | |
| 5,864,438 A * | 1/1999 | Pace | 359/841 |
| 6,847,288 B1 | 1/2005 | Baschnagel, III | |
| 7,178,925 B1 | 2/2007 | Tidwell | |
| 7,287,867 B2 * | 10/2007 | Wellington et al. | 359/841 |
| 2003/0001301 A1 * | 1/2003 | Duroux et al. | 264/40.5 |

FOREIGN PATENT DOCUMENTS

EP 0314839 5/1989

OTHER PUBLICATIONS

EP Search Report for application No. EP 08 16 4588 dated Mar. 6, 2009.

* cited by examiner

*Primary Examiner* — Alessandro Amari
(74) *Attorney, Agent, or Firm* — Reising Ethington P.C.

(57) ABSTRACT

Then invention is related to a rear view mirror attached to a vehicle comprising a mirror housing. The reflective element is fixed in relation to the mirror housing and the mirror housing is movable versus the vehicle by separately extendable elements.

6 Claims, 11 Drawing Sheets

REAR VIEW MIRROR

BACKGROUND OF THE INVENTION

The invention is based on a priority patent application EP 08164588.9 which is hereby incorporated by reference.

The invention is related to a rear view mirror as it is used for vehicles that allow overcoming a couple of problems with existing technical designs. More specially is the invention related to a rear view mirror attached to a vehicle with a mirror housing comprising a reflective element. The reflective element is fixed in relation to the mirror housing and the mirror housing is movable versus the vehicle by separately elongable elements.

The invention also related to a method to adjust a rear view mirror.

PRIOR ART

Rear view mirrors are designed in different designs, but all designs have the objective to provide a rear view field as defined in national or international regulations. Moreover a modern mirror has to offer electrical glass actuation to optimize the rear view field in relation to the driver. More and more mirror assemblies offers electrical power fold functions with the intention to narrow the width of a vehicle at least in parking position or small streets.

On the other side a lot of telescoping mirrors are know that allow to extend the view of a driver with a vehicle towing a trailer.

To achieve all this functions a common modern rear view mirror needs a glass actuator for adapting the mirror glass in relation to the rigid housing of the rear view mirror. For the power fold function a rear view mirror needs an additional actuator and a special design in the mirror base that allows a manual folding of the head in back and forth position according regulations and an electrical driven function for the parking position.

For a telescoping rear view mirror a third actuator is necessary to extend an arm attached to the base of the mirror along this arm's length.

In prior art U.S. Pat. No. 2,552,074 a rear view mirror is attached to a vehicle by an arm. This arm is supported by two other arms. All arms can be mechanically elongated to fold the rear view mirror upwardly for travelling the vehicle through a door.

SUMMARY OF THE INVENTION

The inventional idea solves all these functional requests by mounting a mirror housing with at least three telescoping connections to a vehicle.

In prior art positioning of products of tools are known from robotic applications. For example the EP 0314839 discloses a positioning apparatus with elongable elements positioned in one plane. The elongable elements are pivotally mounted to a support and at least in part pivotally mounted to the element to be positioned.

The telescoping elements in form of an electrical cylinder with a fixed outer housing and a screw driven internal member which is translated in the direction of the housing are available on the market for several purposes.

The invention uses these elongable elements to provide a rear view mirror as it is attached to a vehicle with a fixed reflective element in relation to the housing and a three dimensional motion possibility to achieve the functionalities of a rear view mirror.

Preferably the rear view mirror comprises a fixed reflective mirror. The fixed mirror opens design possibilities and better technical solutions.

The high dimensional movement of the mirror head due to the elongable elements allows positioning the complete mirror head together with the fixed reflective element in relation to the vehicle's driver and to achieve the view filed as defined in several regulations.

In this function the commonly used mirror glass actuator is obsolete. To save the actuator device results in a weight reduction of the mirror head and a reduction of the need to have a die cast base element in the mirror. The overall weight reduction is high.

The number of elongable elements is preferably three or four elements that control the relative position of mirror head versus drivers' position.

Preferably the reflective element is a plastic glass coated with a metal layer. The advantage is again the weight of the whole mirror head that in a basic version of the rear view mirror only comprises the plastic housing optimized to the design and the aerodynamic needs.

In addition a rear view mirror according the invention saves a power fold actuator in the mirror base.

In another advantageous embodiment the rear view mirror is covered with a fabric cover to hide the elongable elements and a harness for connecting electrical functions in the mirror head.

The method to adjust the rear view mirror according the invention allows to fold the rear view mirror in travelling direction and in counter direction without the conventional power fold actuator.

This results in another weight reduction.

SHORT DESCRIPTION OF THE DRAWINGS

The following figures describe the invention but do not restrict the invention to the embodiments. The invention encloses further all equivalent solutions a person skilled in art would know.

DETAILED DESCRIPTION OF THE DRAWINGS

Figure 1:
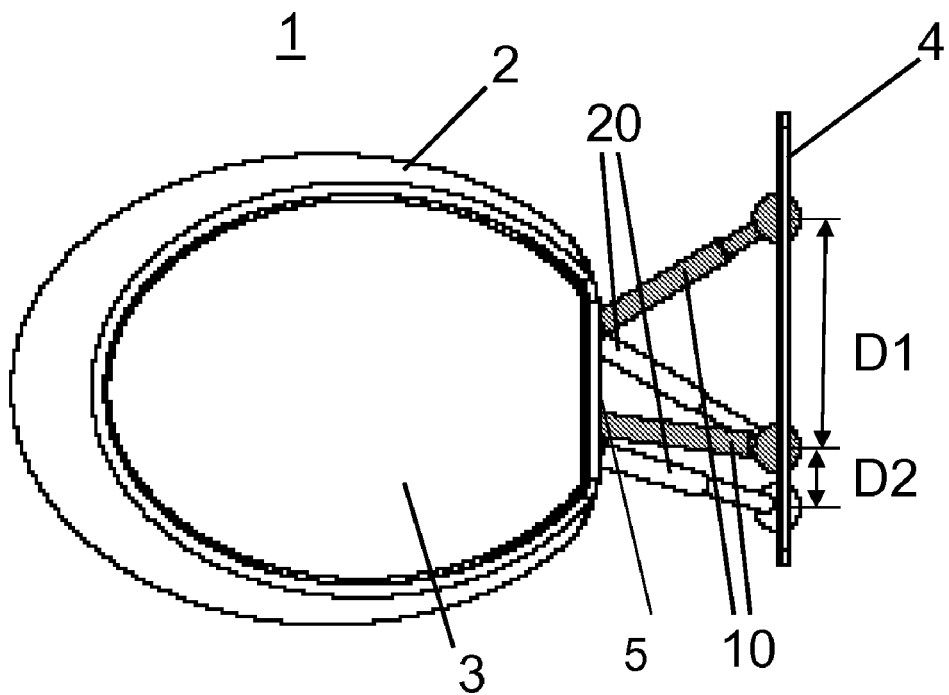
FIG. 1 to 5 show a left rear view mirror in driving position in different views.
Figure 2:
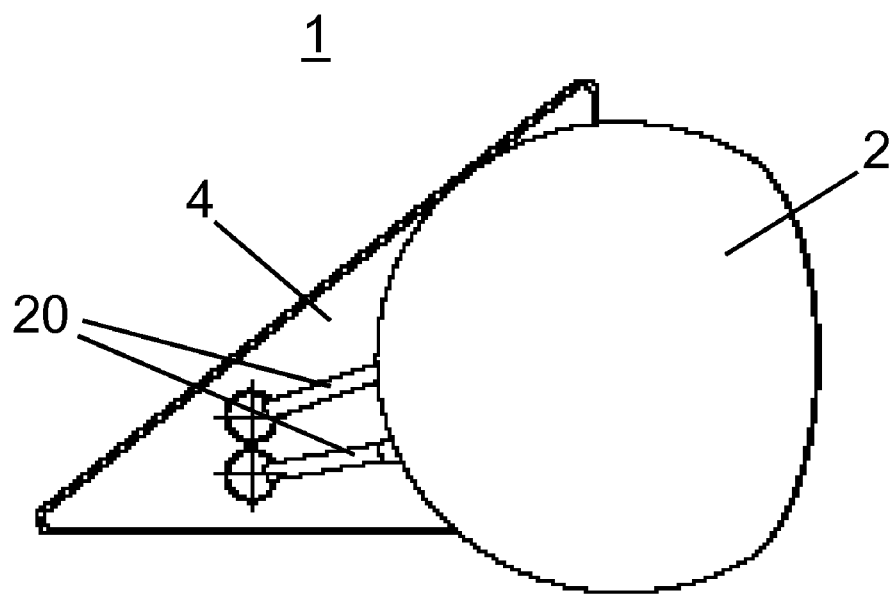
Figure 3:
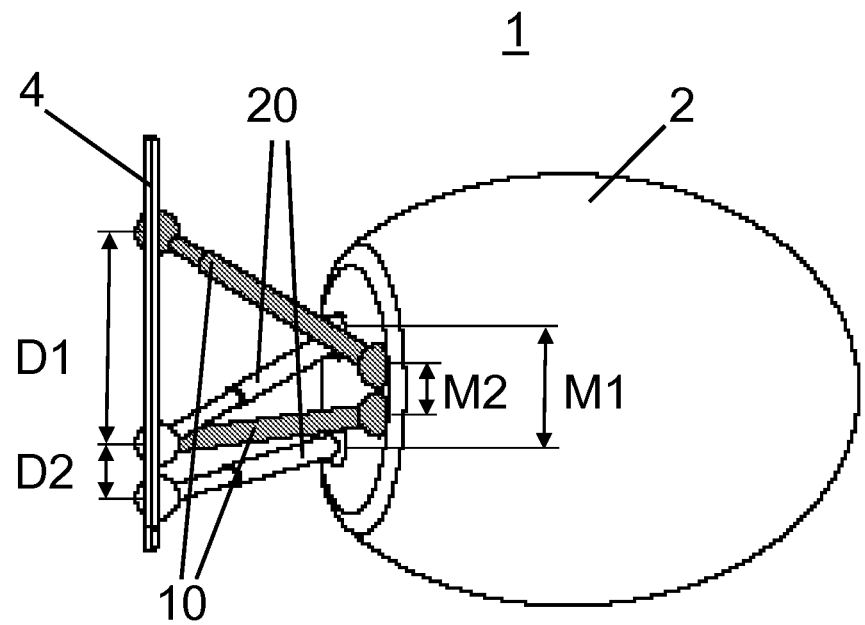
Figure 4:
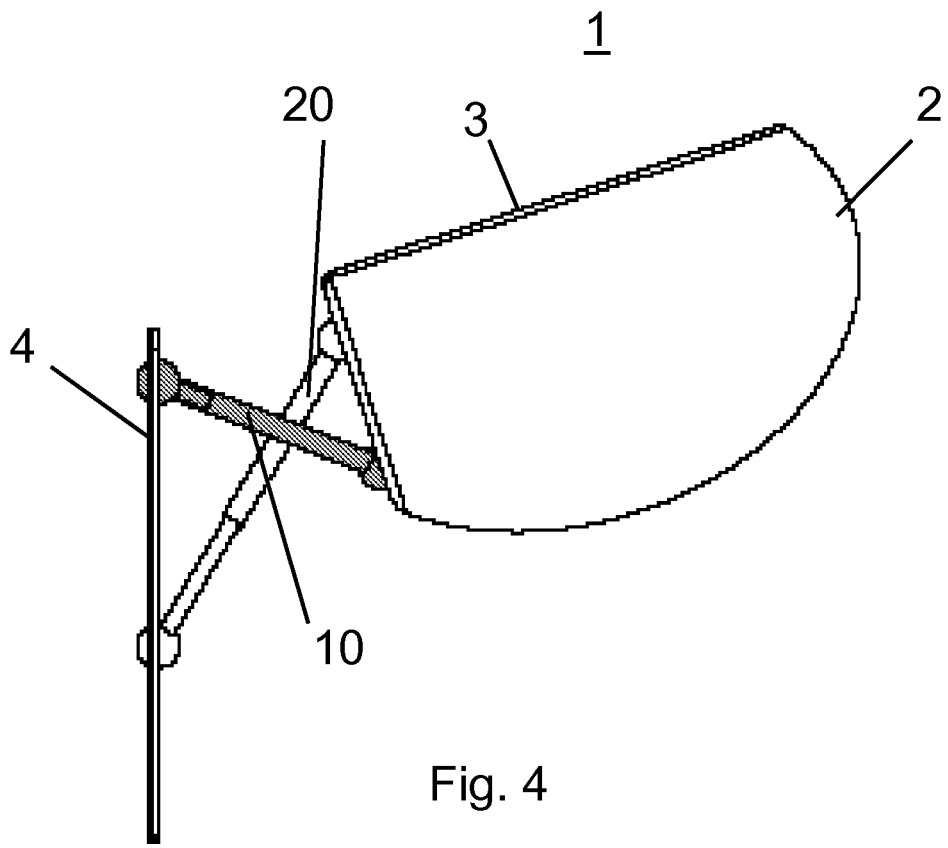
Figure 5:
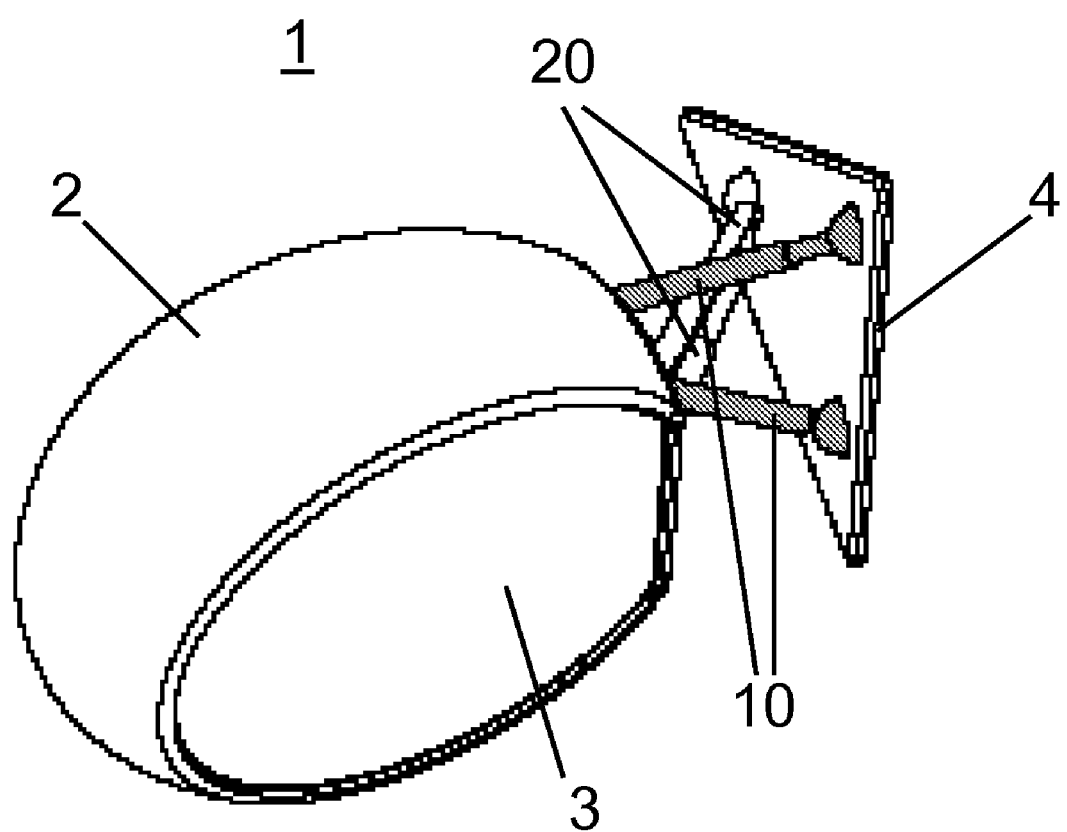
Figure 6:
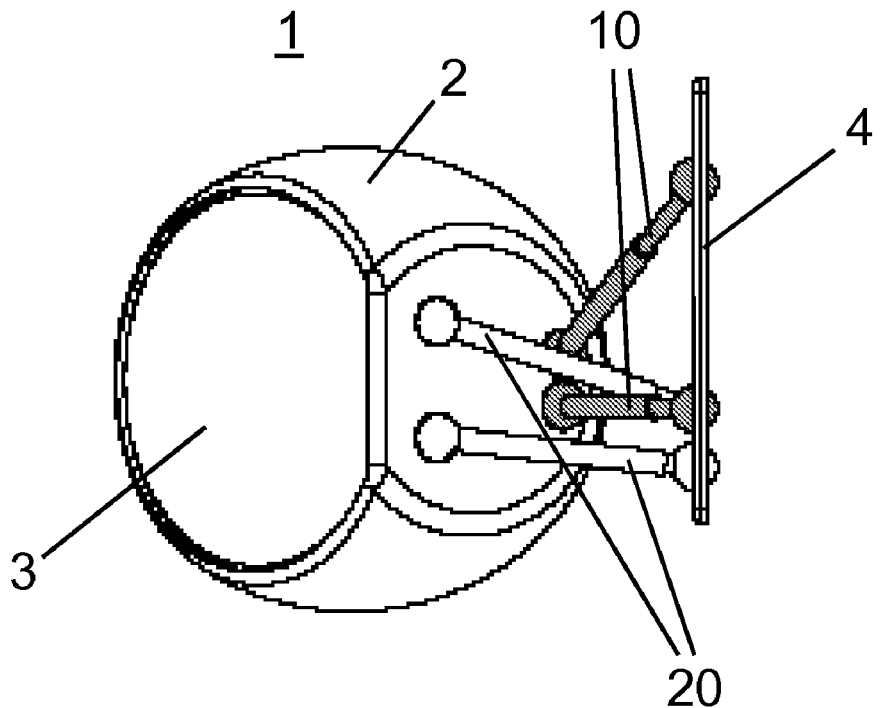
FIG. 6 to 10 show a rear view mirror in a fold away position.
Figure 7:
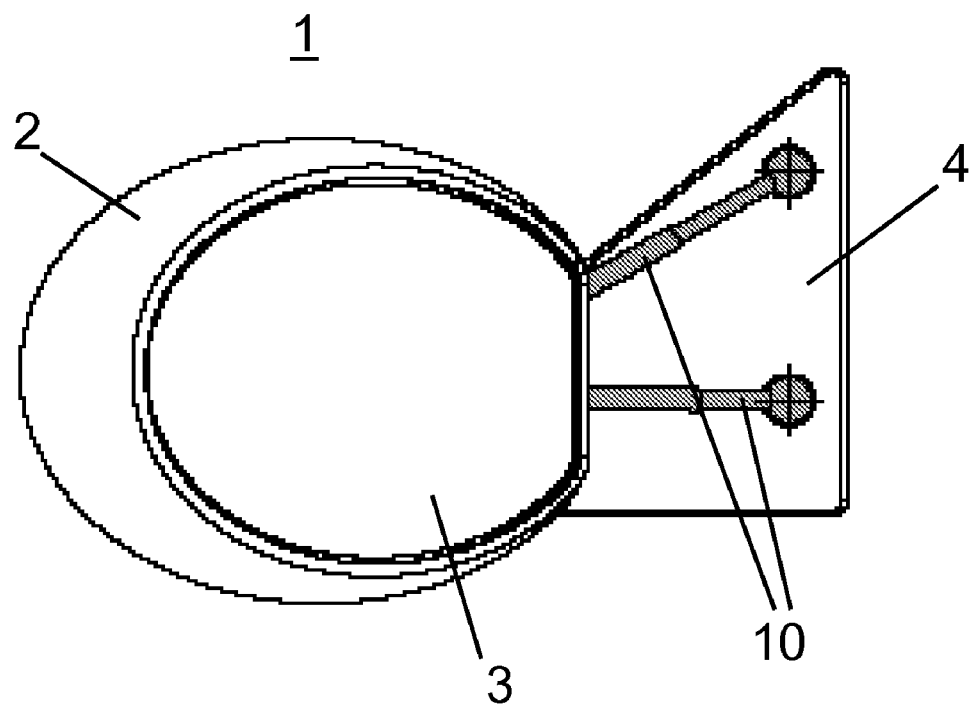
Figure 8:
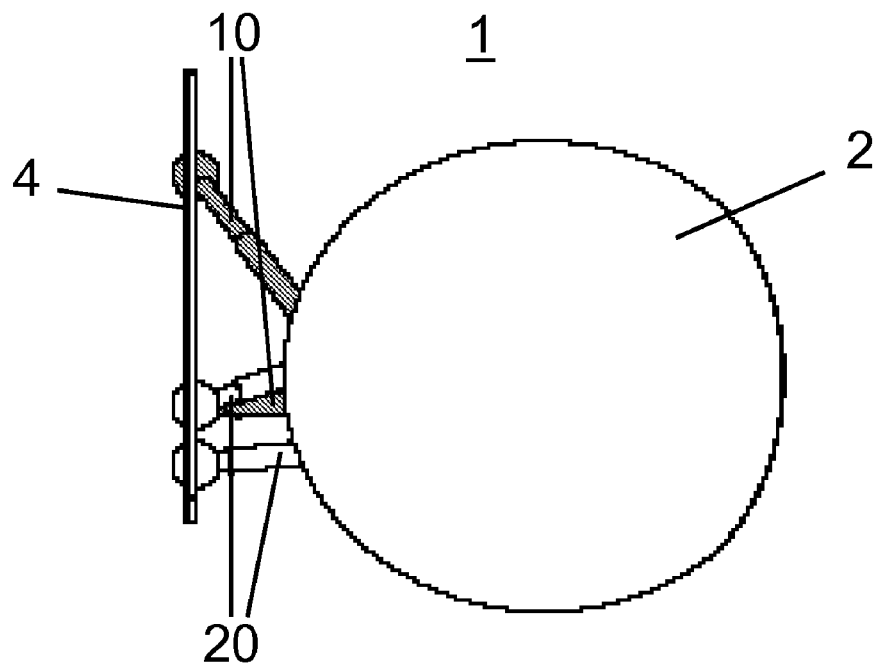

FIG. 1 show the inventional rear view mirror 1. The rear view mirror has two main elements: a mirror housing 2 and the elongable elements 10 and 20. The elongabale elements are attached to a support 4 at the vehicle. The attachment is a pivotable connection to the support that enables the elongable elements to move in three dimensions. The elongable elements are also connected to the mirror housing with pivotable connections. In this embodiment the mirror housing 2 has a flat mounting surface on which the elements 10 and 20 are attached. It is not necessary to attach the elongable elements on a flat surface. They also can be attached on a structured surface or a mounting mean in the mirror housing.

There are two sets of elongable elements: a first set 10 which is fixed to the support 4 close to the vehicle's driver but at the farer end of the mirror head mounting surface 5 and a second set 20 fixed at the farer end of the support 4 but closer to driver's end of the mirror housing mounting surface 5. The first set of elements 10 is attached to the support 4 in a distance D1 between the two telescoping elements. At the mirror housing side these two telescoping elements 10 are arranged in a distance M2. The second set of elongable elements 20 is mounted on the support side in a distance D2 and on the mirror housing side in a distance M1.

The two sets of elongable elements are mounted in a way that one element of the first set 10 extend into the gap between the elements of the second set of elements.

In the embodiments as described in the FIGS. 1 to 15 the attachment positions of the telescoping elements have a distance D2 or M2. In another embodiment the telescoping elements have a single common pivotable member so that D2 and M2 are becoming zero.

The mirror housing comprises a reflective element 3. This reflective element 3 is a coated glass that is mounted into the plastic housing. The mirror glass is fixed in relation to the mirror housing and can be easily mounted by clips or a pressing into a groove. Also other ways to fix the reflective element into the housing are possible. The mirror housing is moulded in one part or several parts according the design needs. It is also possible to mount the mirror glass with a bezel into the mirror housing. It is important that the mirror glass 3 is fixed in relation to the mirror housing. This allows characteristic designs for the gap between glass and plastic needed in existing rear view mirrors is obsolete.

In another embodiment of the invention the mirror glass 3 is a plastic glass. To use a plastic glass opens the possibility to create new designs and again to reduce the all over weight of the mirror head.

A solution with a plastic glass flat or curved surface and injection moulded bezel in one piece reduces the number of productions steps for the rear view mirror. The plastic glass is produced for example in a two component injection mould process wherein a transparent plastic glass material is used to create the substrate for the reflective coating and normal coloured or black plastic material is used to form the bezel structure with curved edge and with the possibility to be connected to the housing of the rear view mirror.

A full plastic rear view mirror can be achieved which is moulded with small tolerances. As a result of a full plastic rear view mirror weight and seize can be reduced to improve the aerodynamic of the rear-view mirror and the vehicle and to reduce $CO_2$ emissions.

In further preferred embodiments the rear view mirror comprises electrical element as known from prior art as all kind of illumination elements as running light, position light, security light, turn signal indicator, reverse light and other illumination types which are allowed by regulation to be installed in a rear view mirror.

Also other electrical elements as sensors, cameras, antennas, indicators and displays are possible to be mounted into the inventional rear view mirror.

The use of modern LED illumination means is preferred again to reduce weight and power consumption of the device.

To connect the electrical element a harness is necessary that is placed between the telescoping elements in a length that enables the telescoping function of the elongable elements.

The position as shown in FIG. 1 to 5 is the driving position The elongable elements 10 and 20 are all extended to a defined length. The combination of lengths defines the relative position to driver's eyes. The driving position can to a some extend be adapted if the vehicle is towing a trailer. The rear view can be extended according to the maximal possible extension lengths of the elongable elements.

Figure 9:
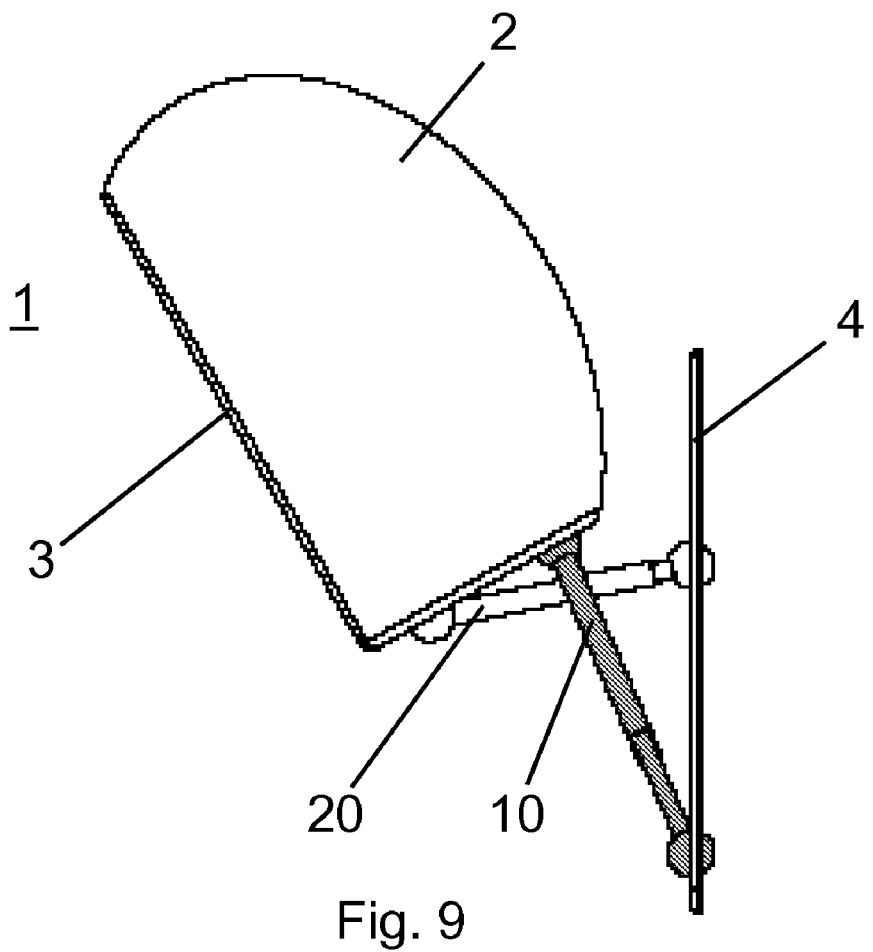
Figure 10:
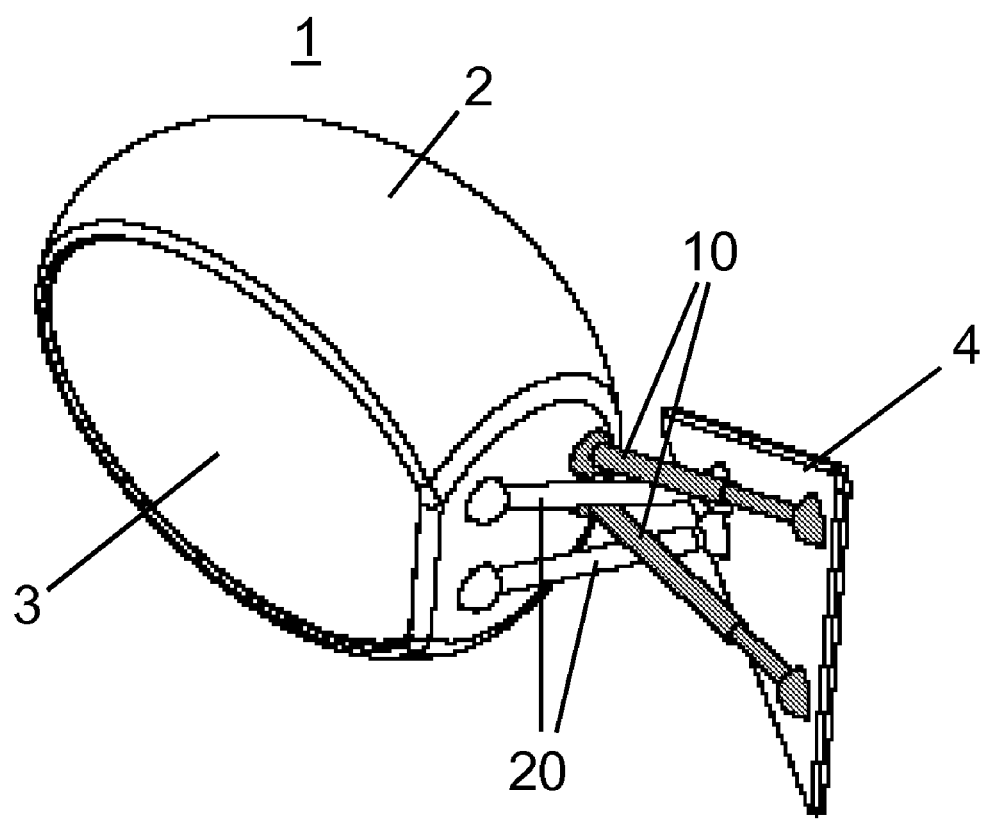
Figure 11:
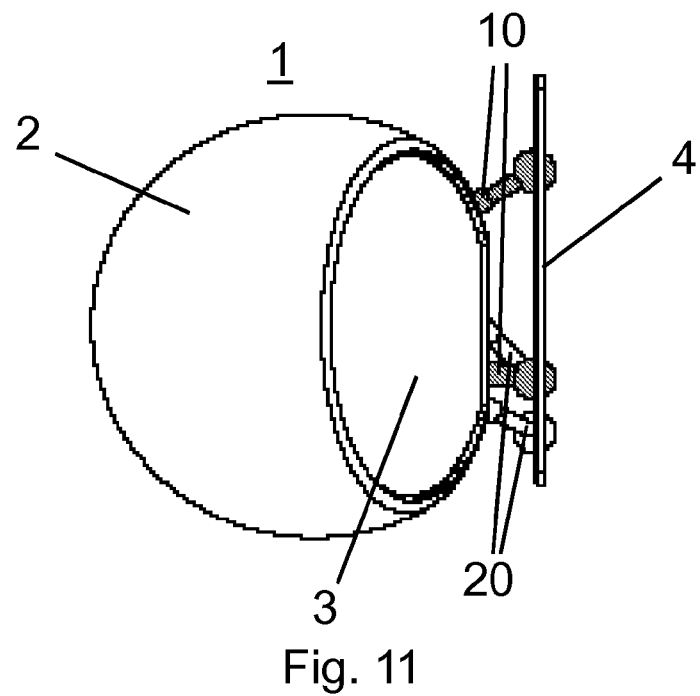
FIG. 11 to 15 show a rear view mirror in park position
Figure 12:
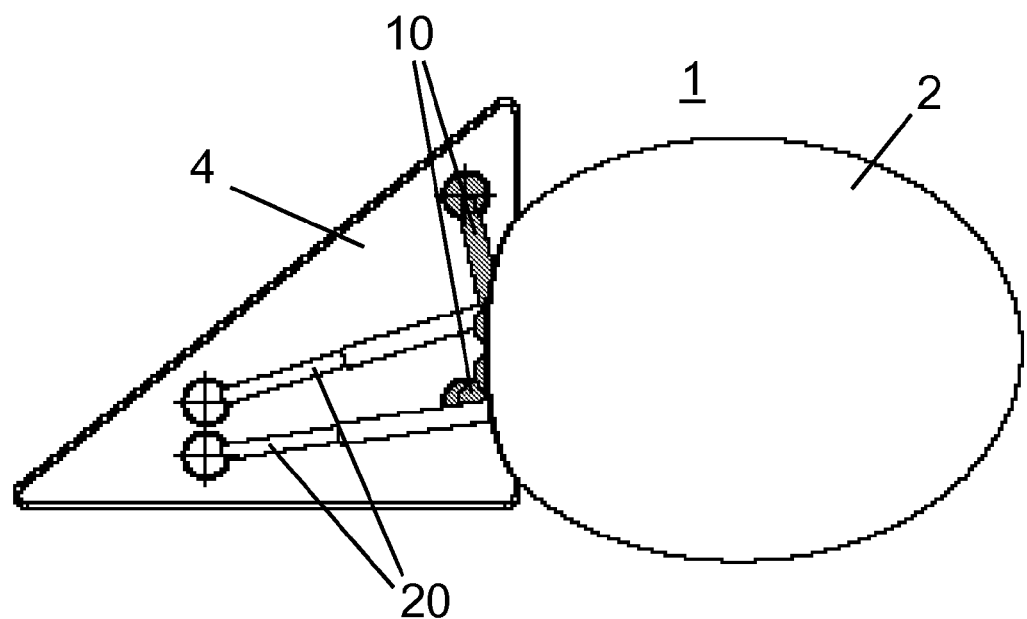
Figure 13:
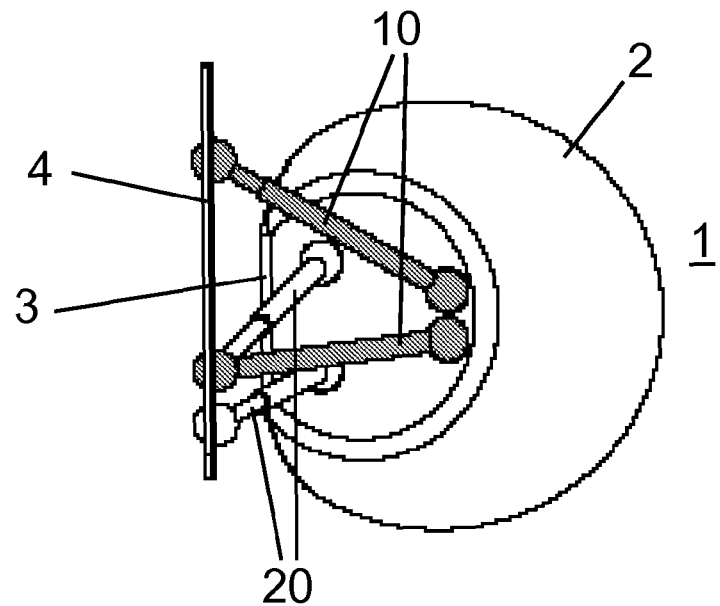
Figure 14:
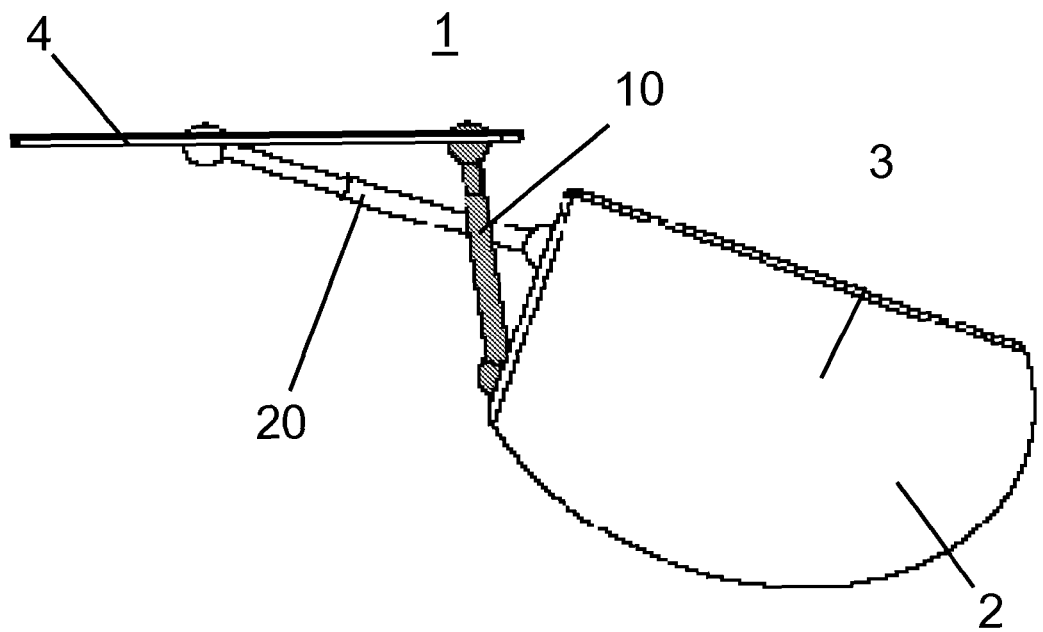
Figure 15:
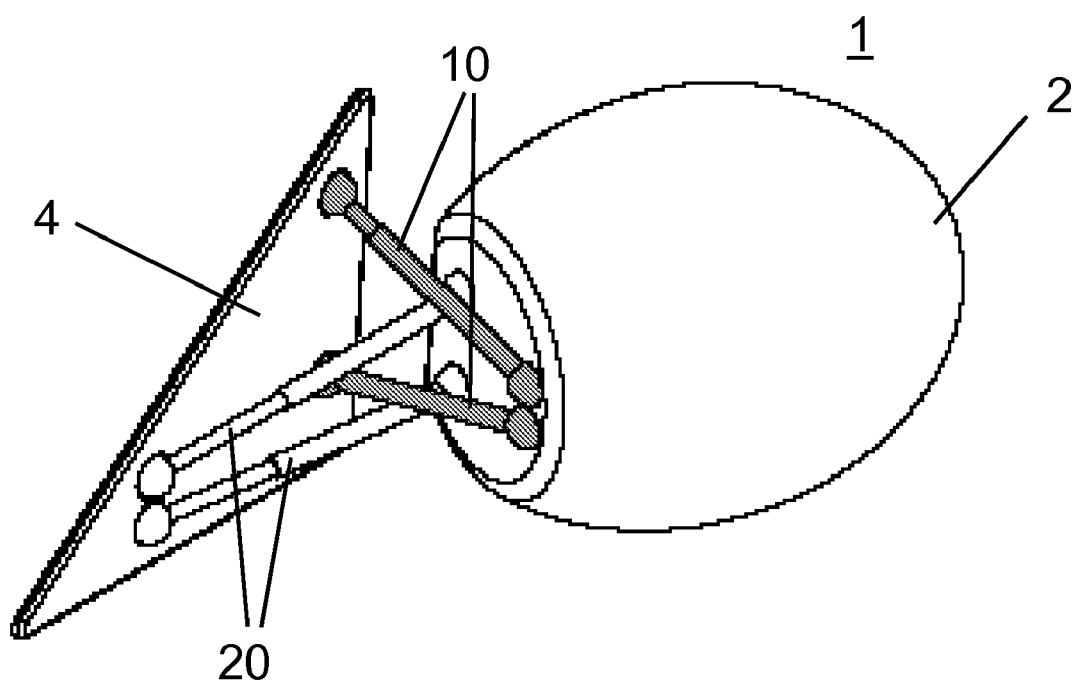
Figure 16:
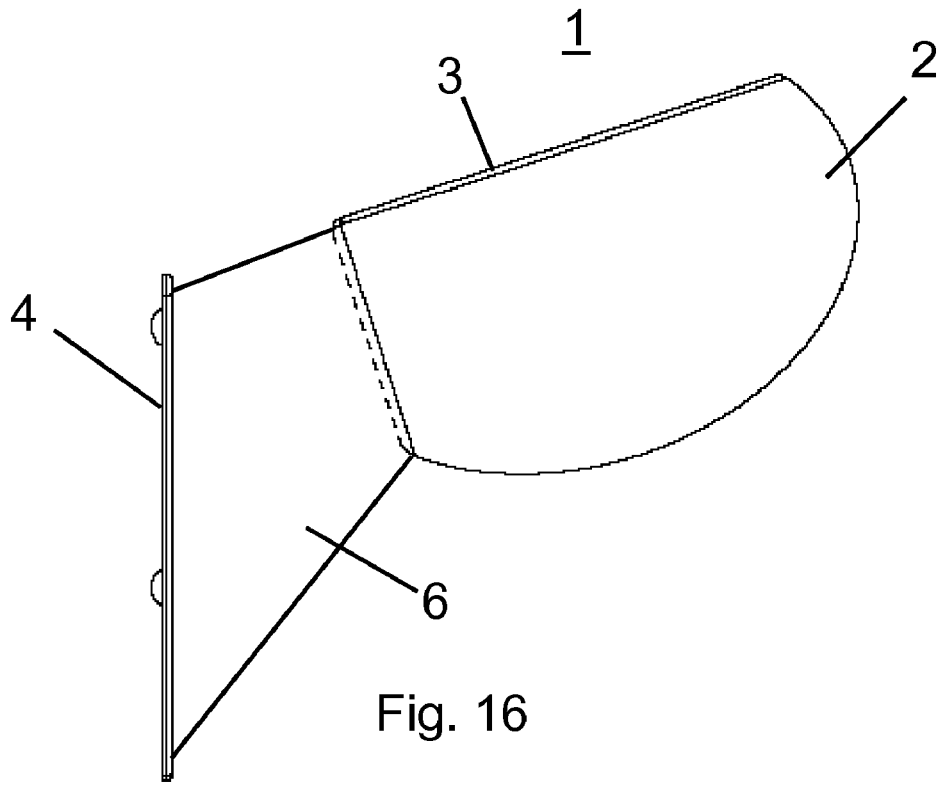
FIG. 16 to 18 show a rear view mirror with a fabric cover.
Figure 17:
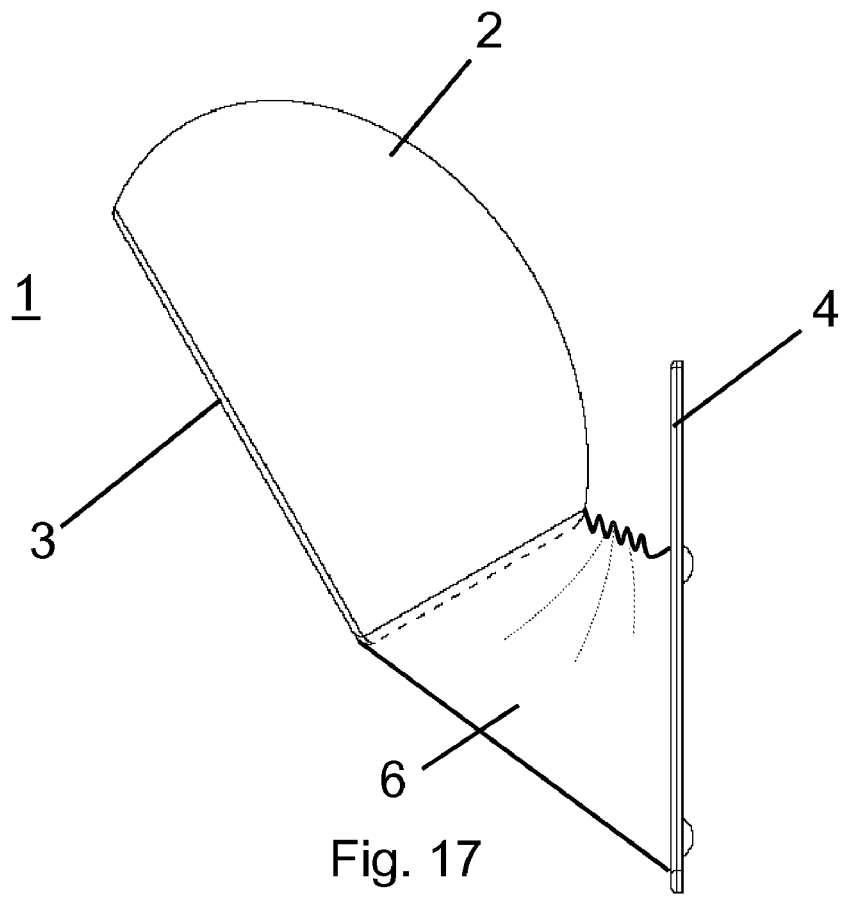
Figure 18:
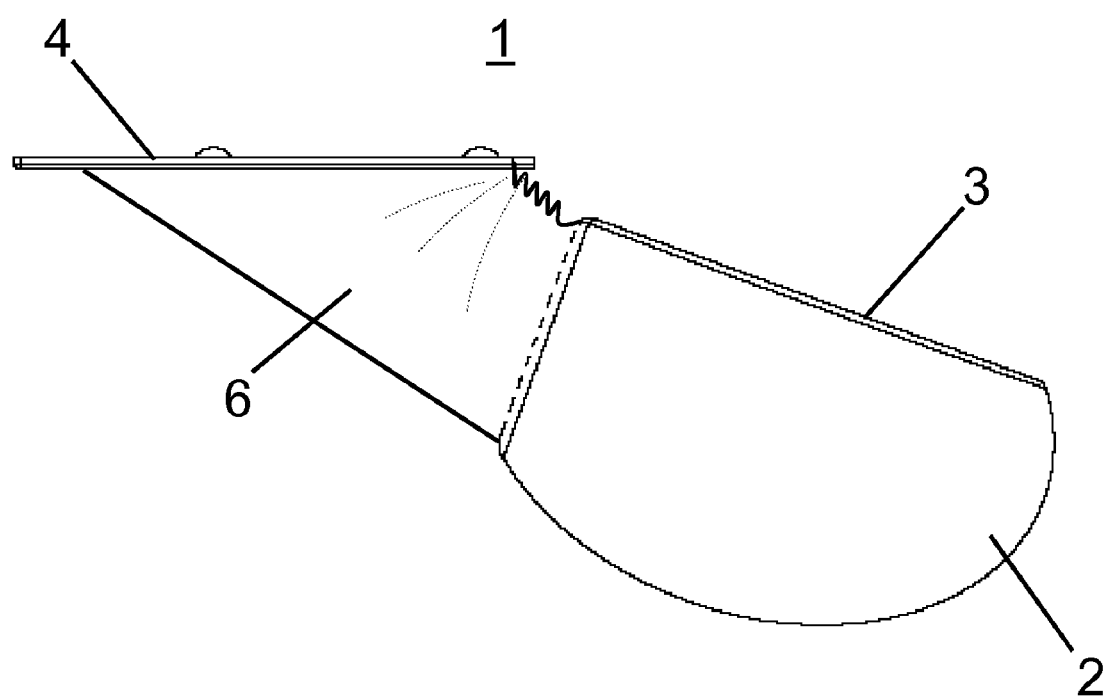

FIGS. 6 to 10 show the folded position that is mandatory for security regulations. The mirror head must be able to be folded in forward direction of a vehicle. In this situation the first set of elongable elements 10 are completely extended and the second set of elongable elements 20 is completely shortened. FIG. 9 shows the extreme position.

The parking position as shown in FIG. 11 to 15 shows the second extreme position of the two sets of elongable elements with full extended set 20 and a completely shortened set 10.

The elongable elements are not hidden in the embodiments of FIG. 1-15. If an electrical element is installed into the mirror housing a harness must be integrated. The appearance to the rear view mirror with a harness will be not sufficient for a smooth design. Therefore the invention proposes to hide the telescoping parts and a harness behind a cover that must be flexible enough to allow the motion of the mirror housing and has a acceptable appearance in the normal driving position.

An example of an alternative non rigid material to cover a vehicle is described in a BMW study overcoming the idea of a metal carriage.

The GINA Light Visionary Model has dispensed with the usual body elements found on production vehicles such as front apron, bonnet, side panels, doors, wheel arches, roof, trunk lid and rear deck. Instead, a structure with a minimum amount of components has taken their place. A special, highly durable and extremely expansion-resistant fabric material stretches across a metal structure. This material offers designers a significantly higher level of freedom of design and functionality.

The fact that the body surface is designed by means of a flexible fabric cover that stretches across a metal substructure means that the materials used must meet exacting requirements. Industrially produced hybrid fabric made from a stabilizing mesh netting support and an outer layer that is both water-repellent and resistant to high and low temperatures is suitable for this application. Another essential material property is a maximum level of dimensional stability. It must remain dimensionally stable irrespective of the temperature and air humidity it is exposed to even after severe and constant expansion. The dimensional stability helps retain the cover's surface tension for a long period of time. The movement of individual body elements creates accurately reproducible folds in the material.

The basic idea behind the skeleton and fabric body for a vehicle was used to build Zeppelin airships. Also in automotive use a vehicle named Velorex was built in the years 1950 to 1970 with bodywork consisting of vinyl stretched over the cage and attached by turn button fasteners.

Today for example Spandex materials are in favor to create flexible bodies.

An example how to cover the area between mirror housing 2 and support 4 with a fabric is shown in FIG. 16 to 19. In the driving position of FIG. 16 the fabric is stretched form the housing to the support 4. The fabric 6 is flexible and allows the fold position as in FIG. 17 or the parking position of FIG. 18. In both extreme positions the one side of the fabric cover produces fold wherein the other side is stretched.

To achieve the fabric cover the fabric is fixed at a frame structure at the mounting surface of the rear view mirror and a frame structure at the support 4. The housing itself can be injection moulded as it is today. The next step of mirror evolution is a rear view mirror with a plastic or metal skeleton fully covered by a flexible elastic fabric material.

The invention claimed is:

1. A rear view mirror assembly comprising: a vehicle support; a mirror housing including a reflective element that is fixed in relation to said mirror housing wherein said reflective element and said mirror housing are movable versus the vehicle by two pairs of elements that are elongated separately and in that each of said two pairs of elements is mounted between said mirror housing and said vehicle support, each of said two pairs of elements being electrical cylinders having a fixed housing and an internal member translating in a direction of said mirror housing, wherein said two pairs of elements can be elongated separately wherein a first pair of said two pairs of elements adjusts said reflective element in a fold forward position by elongating said first pair of said two pairs of elements and where a second pair of said two pairs of elements is shortened and wherein said second pair of elements adjusts said mirror housing and said reflective element in a park position by elongating said second pair of elements in conjunction with said first pair of elements being shortened.

2. A rear view mirror according to claim 1 wherein said mirror housing is attached with at least three extendable elements.

3. A rear view mirror according to claim 2 wherein said reflective element with plastic glass substrate is molded together with at least a part of said mirror housing.

4. A rear view mirror according to claim 1 wherein said reflective element includes a plastic glass substrate.

5. A rear view mirror according to claim 1 wherein said mirror housing includes electrical elements, at least one of the group of running light, turn signal indicator, security light, positioning light, warning indictors, displays, sensors, cameras, antennas, and controllers.

6. A rear view mirror according to claim 1 wherein said rear view mirror assembly is at least partly designed as a substructure covered by a flexible fabric.

* * * * *